(12) United States Patent
Said

(10) Patent No.: US 7,397,953 B2
(45) Date of Patent: Jul. 8, 2008

(54) IMAGE BLOCK CLASSIFICATION BASED ON ENTROPY OF DIFFERENCES

(75) Inventor: Amir Said, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1445 days.

(21) Appl. No.: 09/912,278

(22) Filed: Jul. 24, 2001

(65) Prior Publication Data

US 2003/0068085 A1    Apr. 10, 2003

(51) Int. Cl.
*G06K 9/48* (2006.01)
*G06K 9/00* (2006.01)

(52) U.S. Cl. .................................. 382/199; 382/170
(58) Field of Classification Search ......... 382/168–173, 382/199, 175, 176
See application file for complete search history.

(56) References Cited

U.S. PATENT DOCUMENTS

| | | | | |
|---|---|---|---|---|
| 5,115,477 A | * | 5/1992 | Groezinger | 382/199 |
| 5,150,433 A | * | 9/1992 | Daly | 382/250 |
| 5,271,064 A | * | 12/1993 | Dhawan et al. | 382/266 |
| 5,377,018 A | * | 12/1994 | Rafferty | 358/426.02 |
| 5,481,620 A | * | 1/1996 | Vaidyanathan | 382/169 |
| 5,594,807 A | * | 1/1997 | Liu | 382/128 |
| 6,184,682 B1 | * | 2/2001 | Ehman et al. | 324/309 |
| 6,329,819 B1 | * | 12/2001 | Manduca et al. | 324/309 |
| 6,356,651 B2 | * | 3/2002 | Murakami | 382/128 |
| 6,858,007 B1 | * | 2/2005 | Akselrod et al. | 382/286 |

2001/0043754 A1    11/2001    Memon et al.

FOREIGN PATENT DOCUMENTS

| EP | 0974933 | 1/2000 |
|---|---|---|
| WO | WO 99/53444 | 10/1999 |

OTHER PUBLICATIONS

Vitulano et al. "Edge Detection Using a New Definition of Entropy," 13th International Conference on Pattern Recognition (ICPR'96)—vol. 2, 1996, pp. 141-145.*
Althouse, M.L.G. "Image segmentation by local entropy methods," 1995 International Conference on Image Processing (ICIP'95)—vol. 3, pp. 61-64.*
Boles et al. "An image processing approach for estimating the number of liveprawn larvae in water," ISSPA '99. Proceedings of the Fifth International Symposium on Signal Processing and its Applications, 1999, vol. 2, pp. 571-574.*
Pietikainen et al., "Edge information in color images based on histograms of differences", IEEE, ISBN 0-8186-0742-4, pp. 594-596 (1986).
Chang-Joon Park et al: "An edge-based block segmentation and classification for document analysis with automatic character string extension" System, Nan and Cybernetics, 1996., IEEE International Conference on Beijing, China Oct. 12-17 New York, NY USA XP010206713 pp. 707-712.
Plan N. R, et al: "Entropic Thresholding" Signal Processing, EP Journal Devoted to the Methods and Applications of signal Processing. Elsevier Science Publishers B.V. Amsterdam, NL vol. 16 No. 2 , Feb. 1, 1989 pp. 97-108 XP00098440.
Yin P - Y; "Skew detection and block classification of printed documents" Image and Vision Computing, Jun. 1, 2001, Elsevier, NL vol. 19, No. 8, pp. 567-579 XP002246200.

* cited by examiner

*Primary Examiner*—Colin LaRose

(57) ABSTRACT

Edges in a block of a digital image are detected by determining an entropy of a histogram of the block.

24 Claims, 4 Drawing Sheets

IMAGE BLOCK CLASSIFICATION BASED ON ENTROPY OF DIFFERENCES

BACKGROUND

The present invention relates to digital images. More specifically, the present invention relates to edge detection in blocks of digital images.

Compound documents may contain text, drawings and photo regions (sometimes overlaid), complex backgrounds (e.g., text boxes), watermarks and gradients. For example, magazines, journals and textbooks usually contain two or more of these features.

A single compression algorithm is usually not suitable for compressing compound documents. Compression algorithms such as JPEG are suitable for compressing photo regions of the compound color documents, but they are not suitable for not compressing text regions of the compound color documents and other regions containing edges. These lossy compression algorithms are based on linear transforms (e.g., discrete cosine transform, discrete wavelet transform) and do not compress edges efficiently. They require too many bits, and may produce very objectionable artifacts around text.

Compression algorithms such as CCITT, G4 and JBIG are suitable for compressing black and white text regions and other regions containing edges. However, compression algorithms such as CCITT, G4 and JBIG are not suitable for compressing photo regions.

A typical solution is to pre-process the documents, separating the regions according to the type of information they contain. For instance, regions containing edges (e.g., regions containing text, line-art, graphics) and regions containing natural features (e.g., regions containing photos, color backgrounds and gradients) are separated and compressed according to different algorithms.

However, algorithms for separating the regions tend to be very complex, requiring large amounts of memory and high bandwidth. The complexity, high bandwidth and large memory requirements make many algorithms unsuitable for embedded applications such as printers, scanners and other hardcopy devices.

SUMMARY

According to one aspect of the present invention, edges in a block of a digital image are detected by-determining an entropy of a histogram of the block. Other aspects and advantages of the present invention will become apparent from the following detailed description, taken in conjunction with the accompanying drawings, illustrating by way of example the principles of the present invention.

DETAILED DESCRIPTION

Figure 1:
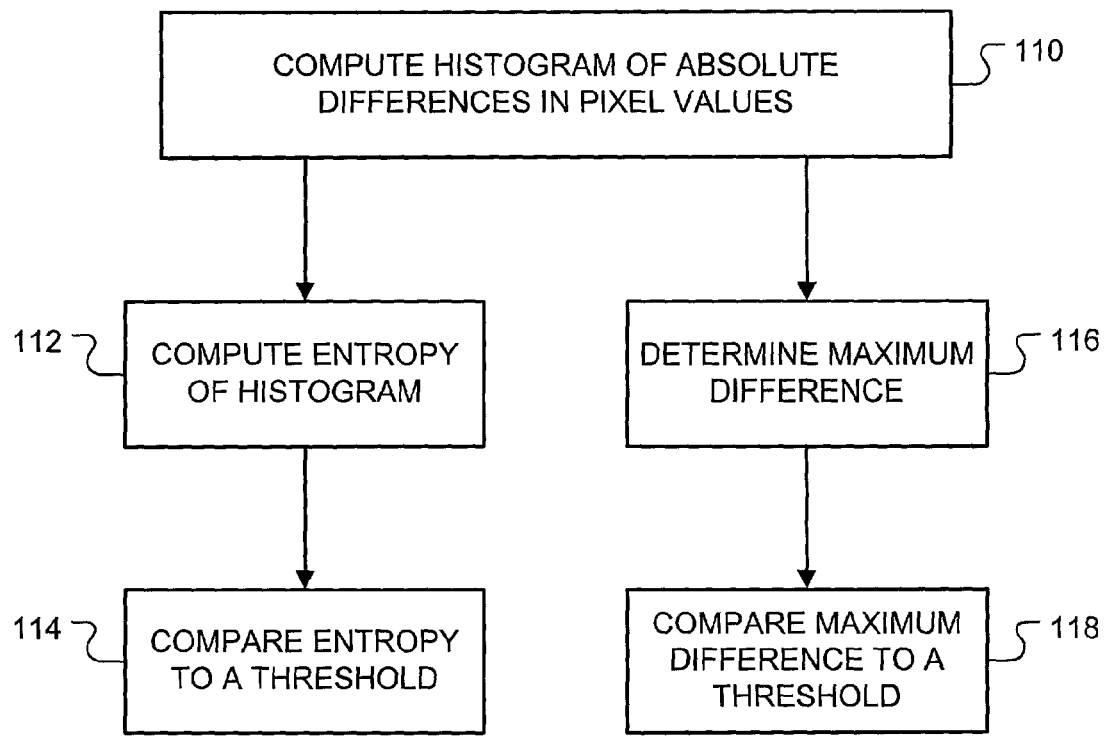
FIG. 1 is an illustration of a method for detecting the presence of edges in an image block.

As shown in the drawings for purposes of illustration, the present invention is embodied in a method for detecting edges in blocks of a digital image. The method involves creating a histogram from differences in pixel luminance, and computing the entropy of the histogram. This method is much simpler than conventional approaches, such as morphological analysis. The entropy can be computed very efficiently using only a look-up table.

Reference is made to FIG. 1, which illustrates a method for detecting edges in a block of a digital image. The digital image is made up of a plurality of pixels, each pixel represented by an n-bit word. The edge detection method is concerned with differences in luminance; therefore, if the n-bit words represent RGB color space, they should be converted to luminance values. For example, the n-bit words could be converted to grayscale values (e.g., [R+G+B]/3) or values of a luminance component of a color space (e.g., YUV, Yab) having a luminance (Y) component.

The block may be of any size. For example, the block may by an 8×8 block of pixels. The blocks may have geometries other than square.

The edge detection does not identify the location of an edge in a block; it merely indicates the presence of an edge in a block. The edge detection method is performed by computing a histogram of absolute differences in luminance values of adjacent pixels (110). Horizontal and vertical absolute differences of adjacent pixels may be computed as follows:

$$d_{i,j} = |p_{i,j} - p_{i,j-1}| \text{ (horizontal)}$$

$$d_{i,j} = |p_{i,j} - p_{i-1,j}| \text{ (vertical)}$$

where and $p_{i,j}$ represents the luminance value of the pixel in the $i^{th}$ row and $j^{th}$ column of the block.

Figure 2A:
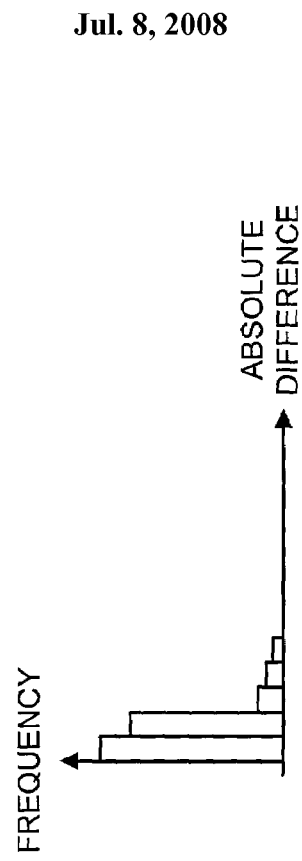
FIGS. 2a and 2b are histograms representing natural image features in an image block.
Figure 2B:
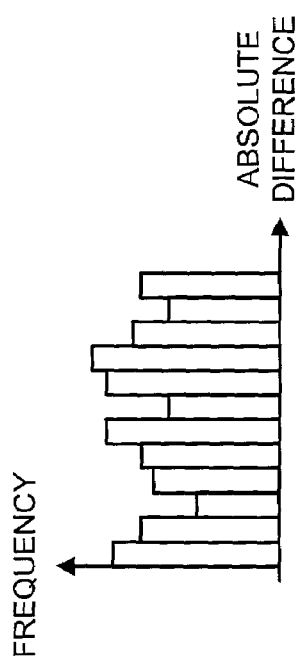
Figure 2C:
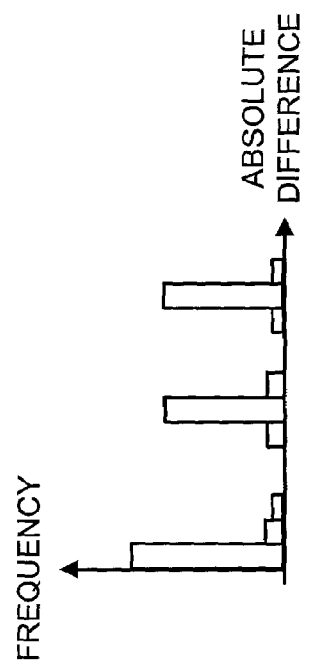
FIGS. 2c and d are histograms representing text and graphics in an image block.
Figure 2D:
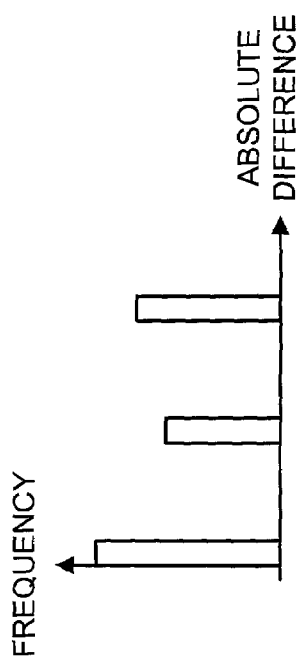

FIGS. 2a and 2b show exemplary histograms of natural features (e.g., photos), graphic arts and complex patterns. FIGS. 2c and 2d show exemplary histograms of text and graphics. Blocks that are part of photos or complex graphic patterns usually have histograms that are flat or are peaked at zero (flat regions on photos). Blocks with text and graphics normally usually have histograms containing a few isolated peaks. Sometimes the edges are blurred, producing peaks that are not isolated, plus some random differences.

The entropy of the histogram is computed to determine whether edges are present in the block (112). The entropy may be computed as follows.

$$E(h) = \log(T) - \frac{1}{T} \sum_{h_n \neq 0} h_n \log(h_n)$$

where n=0, . . . , C are a set of non-negative numbers corresponding to bin numbers of the histogram; $h_n$=0, . . . , C are a set of non-negative numbers corresponding to heights (i.e., frequencies of occurrences) of the bins; and $$T = \sum_{n=0}^{C} h_n$$

(the total area of the histogram).

Consider the example of a 4×4 block having the following luminance values.

| 0 | 0 | 255 | 255 |
|---|---|-----|-----|
| 0 | 0 | 255 | 255 |
| 0 | 0 | 255 | 255 |
| 0 | 0 | 255 | 255 |

Figure 3:
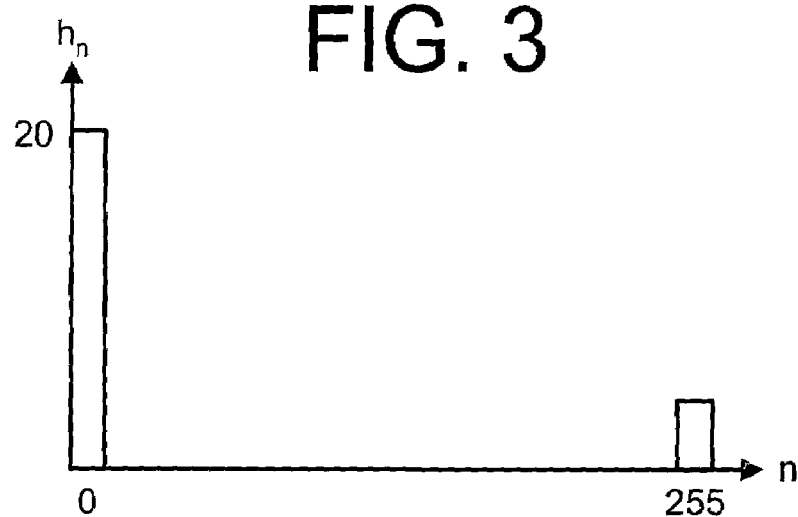
FIG. 3 is a histogram representing an exemplary image block containing a vertical edge.

These values represent a vertical edge. Horizontal and vertical absolute differences computed according to the equations above yield the following results: 12 vertical 0's, 8 horizontal 0's and 4 horizontal 255's. Thus the histogram, which is shown in FIG. 3, has two non-zero bins: $h_0$=20 and $h_{255}$=4. All other bins ($h_1, \ldots, h_{254}$) equal zero. The total area T=24, and the entropy E(h) equals $$E(h) = \log(24) - \frac{1}{24}[20\log(20) + 4\log(4)].$$

After the entropy value E(h) has been determined, it is compared to an absolute threshold (114). The maximum absolute difference in the block is also determined (116) and compared to a threshold (118). These comparisons indicate whether the block contains a significant edge. Smooth regions are characterized by low entropy and a low maximum difference. Regions having large random differences (e.g., noise) are characterized by high entropy and a high maximum difference. Regions having edges are characterized by low entropy and a high maximum difference. In the example above, the entropy is low and the maximum difference (255) is high. Therefore, the block is identified as containing an edge. The location of the edge and the type of edge (horizontal, vertical) are not determined; only the presence is determined.

The maximum difference is a simple way of determining whether the block contains a smooth region or an edge. Variance is a different measure that can be used to determine whether the block contains a smooth region or an edge.

After a block is processed, it may compressed by the appropriate compression algorithm. The edge detection allows the proper compression algorithm to be applied to the block. If a block contains an edge, it is encoded with a lossless compression algorithm. If a block does not contain an edge, it is encoded with a lossy compression algorithm.

Since the entropy function E(h) is computed from logarithms and multiplication, it would appear to be computationally costly. However, it is quite the opposite. Factors of the entropy function can be pre-computed, scaled and rounded to integers, so that all complex computations are replaced by table look-up.

The entropy function may be normalized to allow a single comparison to be performed (instead of a first comparison to an entropy threshold and a second comparison to a maximum difference threshold). The entropy function may be normalized as follows:

$$E'(h) = \frac{a(E(h) + b)}{\mu(h) + c}$$

where E'(h) is the normalized function, μ(h) is the maximum argument in the histogram, and a, b, and c are constants that normalize the entropy function E(h), and change the sensitivity of the classification. The maximum argument μ(h) may be computed as $$\mu(h) = \max_{h_n \neq 0}(n).$$

The constants should be chosen so that E'(h) is small when the block contains edges, and E'(h) is large in all other cases. Under those conditions, a block is classified as containing at least one edge if E'(h) is smaller than a given threshold (e.g., E'(h)<1).

Figure 4:
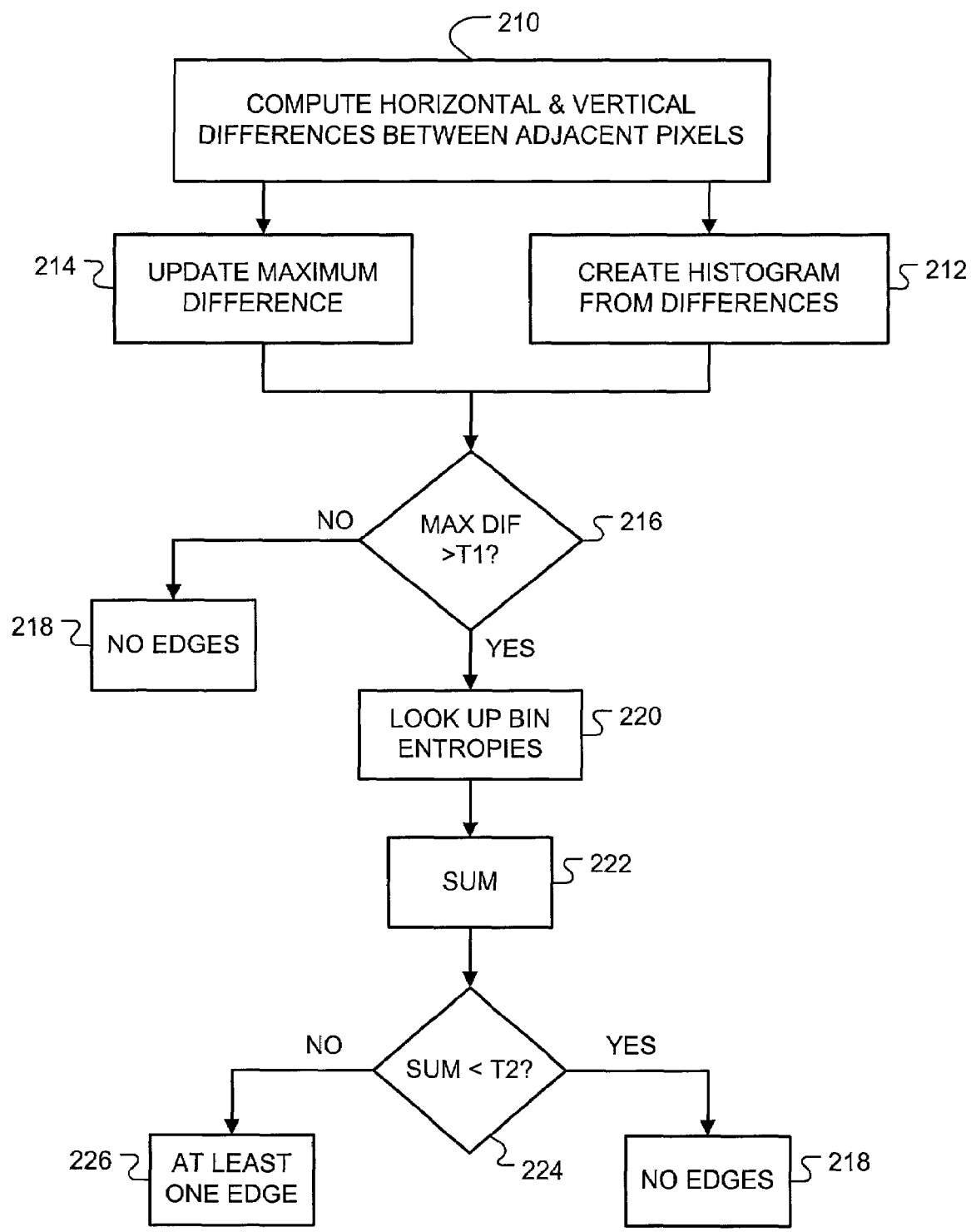
FIG. 4 is an illustration of a method of using a lookup table to determine the entropy and maximum pixel difference in an image block

Reference is now made to FIG. 4. The lookup table may be used as follows. The table has Q entries (0, . . . , Q−1). Each entry Q corresponds to a scaled bin height. The entries are rounded off to integers.

Horizontal and vertical absolute differences in luminance between adjacent pixels are computed (210) and a histogram is created from the differences (212). The maximum difference is updated as the histogram is being created (214).

After the histogram has been created, the maximum luminance difference is compared to a first threshold T1 (216). If the maximum difference is less than the threshold, the block is identified as not containing any edges (218). If the maximum difference is greater than the threshold, the entropy of the histogram is computed.

The entropies of the histogram bins are looked up in the table as a function of bin height (220), and the bin entropies are summed (222). If the sum is greater than a second threshold T2 (224), the block is identified as not containing any edges (218). If the sum is less than or equal to the threshold, the block is identified as containing at least one edge (226).

Figure 5:
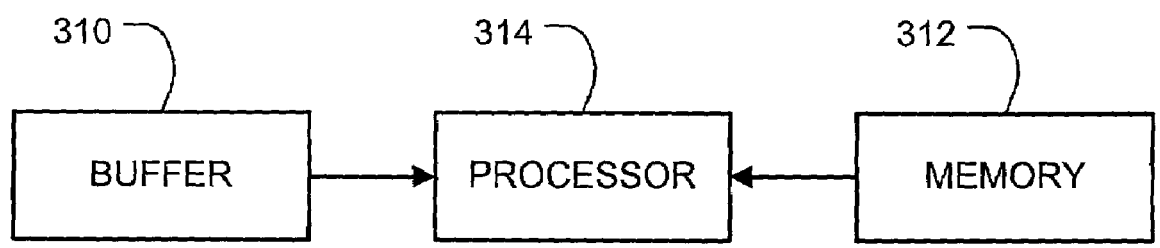
FIG. 5 is an illustration of a hardware implementation of the method of FIG. 1.

Reference is now made to FIG. 5, which shows a hardware implementation of the edge detection method. A block of data is stored in a buffer 310. Memory 312 stores a program for instructing a processor 314 to detect edges in the buffered block, the edges being detected according to the edge detection method herein. The processor 314 may also perform compression using an algorithm that is selected according to the results of the edge detection.

The present invention is not limited to image compression. For example, the present invention may be applied to video and photo segmentation.

The present invention is not limited to the specific embodiments described and illustrated above. Instead, the present invention is construed according to the claims that follow.

The invention claimed is:

1. A computer-implemented method comprising:
   deriving blocks of image values from an image;
   for each of one or more of the blocks,
      determining a respective histogram of image value differences in the block,
      computing a respective entropy value from the respective histogram, and based on the respective entropy value producing a respective result identifying the block as either an edge-containing block or a non-edge-containing block; and performing at least one operation on the image based on the respective results produced for ones of the blocks.

2. The method of claim 1, wherein for each of the one or more blocks the computing comprises retrieving variable values of an entropy function from a lookup table containing a mapping between values of the respective histogram and the variable values, and evaluating the entropy function based on the retrieved variable values.

3. The method of claim 2, wherein the variable values in the lookup table are scaled and rounded to integers.

4. The method of claim 1, further comprising for each of the one or more blocks determining a respective range value corresponding to a maximum difference of image values in the block.

5. The method of claim 4, wherein the producing comprises for each of the one or more blocks producing the respective result based on a comparison of the respective entropy value to a first threshold and a comparison of the respective range value to a second threshold.

6. The method of claim 4, wherein the producing comprises for each of the one or more blocks producing the respective result identifying the block as an edge-containing block in response to a determination that the respective entropy value corresponds to a low block entropy and the respective range value corresponds to a high block range.

7. The method of claim 4, wherein the producing comprises for each of the one or more blocks producing the respective result identifying the block as a non-edge-containing block in response to a determination that the range value is zero.

8. The method of claim 1, wherein the producing comprises for each of the one or more blocks determining the respective entropy value based on an entropy function E(h) represented by $$E(h) = \log(T) - \frac{1}{T} \sum_{h_n \neq 0} h_n \log(h_n).$$

wherein T is a total area of the respective histogram h, and $h_n$, is a value of a bin n of the respective histogram.

9. The method of claim 8, wherein the producing comprises for each of the one or more blocks determining the respective entropy value from a normalized version of the entropy function E(h).

10. The method of claim 1, wherein for each of the one or more blocks the determining comprises determining a respective frequency distribution of magnitudes of differences between ones of the image values corresponding to adjacent image elements in the block.

11. Apparatus comprising:
a memory; and
a processor coupled to the memory and operable to perform operations comprising
deriving blocks of image values from an image,
for each of one or more of the blocks,
determining a respective histogram of image value differences in the block,
computing a respective entropy value from the respective histogram, and
based on the respective entropy value producing a respective result identifying the block as either an edge-containing block or a non-edge-containing block, and
performing at least one operation on the image based on the respective results produced for ones of the blocks.

12. The apparatus of claim 11, wherein in the computing the processor is operable to perform for each of the one or more blocks operations comprising retrieving variable values of an entropy function from a lookup table containing a mapping between values of the respective histogram and the variable values, and evaluating the entropy function based on the retrieved variable values.

13. The apparatus of claim 11, wherein for each of the one or more blocks the processor is operable to perform operations comprising determining a respective range value corresponding to a maximum difference of image values in the block.

14. The apparatus of claim 13, wherein in the producing the processor is operable to perform operations comprising producing the respective result based on a comparison of the respective entropy value to a first threshold and a comparison of the respective range value.

15. The apparatus of claim 14, wherein in the producing the processor is operable to perform operations comprising producing the respective result identifying the block as an edge-containing block in response to a determination that the respective entropy value corresponds to a low block entropy and the respective range value corresponds to a high block range.

16. The apparatus of claim 11, wherein in the producing the processor is operable to perform for each of the one or more blocks operations comprising determining the respective entropy value based on an entropy function E(h) represented by $$E(h) = \log(T) - \frac{1}{T} \sum_{h_n \neq 0} h_n \log(h_n)$$

wherein T is a total area of the respective histogram h, and $h_n$ is a value of a bin n of the respective histogram.

17. The apparatus of claim 16, wherein in the producing the processor is operable to perform for each of the one or more blocks operations comprising determining the respective entropy value from a normalized version of uses a normalized version of the entropy function E(h).

18. A computer-readable medium for arranging graphic objects on a page, the computer-readable medium storing computer-readable instructions causing a computer to perform operations comprising:
deriving blocks of image values from an image;
for each of one or more of the blocks,
determining a respective histogram of image value differences in the block,
computing a respective entropy value from the respective histogram, and
based on the respective entropy value producing a respective result identifying the block as either an edge-containing block or a non-edge-containing block: and
performing at least one operation on the image based on the respective results produced for ones of the blocks.

19. The computer-readable medium of claim 18, wherein in the producing the computer-readable instructions cause the computer to perform for each of the one or more blocks operations comprising determining the respective entropy value based on an entropy function E(h) represented by $$E(h) = \log(T) - \frac{1}{T} \sum_{h_n \neq 0} h_n \log(h_n)$$

wherein T is a total area of the respective histogram h, and $h_n$ is a value of a bin n of the respective histogram.

20. The computer-readable medium of claim 19, wherein in the producing the computer-readable instructions cause the computer to perform for each of the one or more blocks operations comprising determining the respective entropy value from a normalized version of the entropy function E(h).

21. The computer-readable medium of claim 18, wherein in the computing the computer-readable instructions cause the computer to perform operations comprising retrieving variable values of an entropy function from a lookup table containing a mapping between values of the respective histogram and the variable values, and evaluating the entropy function based on the retrieved variable values.

22. The computer-readable medium of claim 18, wherein the computer-readable instructions cause the computer to perform for each of the one or more blocks operations comprising determining a respective range value corresponding to a maximum difference of image values in the block.

23. The computer-readable medium of claim 22, wherein in the producing the computer-readable instructions cause the computer to perform for each of the one or more blocks operations comprising producing the respective result based on a comparison of the respective entropy value to a first threshold and a comparison of the respective range value to a second threshold.

24. The computer-readable medium of claim 22, wherein in the producing the computer-readable instructions cause the computer to perform for each of the one or more blocks operations comprising producing the respective result identifying the block as a non-edge-containing block in response to a determination that the range value is zero.

\* \* \* \* \*

UNITED STATES PATENT AND TRADEMARK OFFICE
CERTIFICATE OF CORRECTION

PATENT NO. : 7,397,953 B2
APPLICATION NO. : 09/912278
DATED : July 8, 2008
INVENTOR(S) : Amir Said Page 1 of 1

It is certified that error appears in the above-identified patent and that said Letters Patent is hereby corrected as shown below:

In column 1, line 61, delete "$d$" and insert -- $2d$ --, therefor.

In column 4, line 60, in Claim 1, after "method" insert -- , --.

In column 5, line 41, in Claim 8, after "$\log(h_n)$" delete "." and insert -- , --, therefor.

In column 5, line 45, in Claim 8, after "$h_n$" delete ",".

In column 5, line 57, in Claim 11, after "Apparatus" insert -- , --.

In column 6, lines 47-48, in Claim 17, delete "uses a normalized version of".

In column 6, line 62, in Claim 18, after "block" delete ":" and insert -- ; --, therefor.

Signed and Sealed this

Twenty-seventh Day of January, 2009

JOHN DOLL
*Acting Director of the United States Patent and Trademark Office*